United States Patent
Porter et al.

(10) Patent No.: US 7,055,038 B2
(45) Date of Patent: May 30, 2006

(54) METHOD AND APPARATUS FOR MAINTAINING SECURE AND NONSECURE DATA IN A SHARED MEMORY SYSTEM

(75) Inventors: Allen J. C. Porter, Sunderland (CA); Chun Wang, Toronto (CA); Kevork Kechichian, Unionville (CA); Gabriel Varga, Toronto (CA); David Strasser, North York (CA)

(73) Assignee: ATI International SRL, Christchurch (BB)

( * ) Notice: Subject to any disclaimer, the term of this patent is extended or adjusted under 35 U.S.C. 154(b) by 834 days.

(21) Appl. No.: 09/850,356

(22) Filed: May 7, 2001

(65) Prior Publication Data

US 2002/0163522 A1    Nov. 7, 2002

(51) Int. Cl.
G06F 12/14 (2006.01)
G06T 1/00 (2006.01)
H04L 9/00 (2006.01)

(52) U.S. Cl. .................. 713/193; 380/216; 382/276; 713/166; 726/27

(58) Field of Classification Search ........... 380/216; 713/166, 193
See application file for complete search history.

(56) References Cited

U.S. PATENT DOCUMENTS

| | | | | |
|---|---|---|---|---|
| 4,787,031 A | * | 11/1988 | Karger et al. | 718/100 |
| 5,107,443 A | * | 4/1992 | Smith et al. | 715/751 |
| 5,825,879 A | * | 10/1998 | Davis | 380/216 |
| 6,148,403 A | * | 11/2000 | Haneda et al. | 713/200 |

FOREIGN PATENT DOCUMENTS

WO    WO 200225416 A2 *    3/2002

* cited by examiner

*Primary Examiner*—Gregory Morse
*Assistant Examiner*—Matthew Heneghan
(74) *Attorney, Agent, or Firm*—Vedder, Price, Kaufman & Kammholz, P.C.

(57) ABSTRACT

A graphics processor receives a compressed encrypted video stream. The graphics processor decrypts the compressed encrypted video stream and stores a decrypted version (i.e., a decrypted compressed video stream) in a protected portion of an on-chip or off-chip video memory. The graphics processor then permits processors and other bus masters on the graphics processor to access the on-chip video memory, but conditionally limits access to other bus masters that are located off-chip, such as a central processing unit located off-chip and coupled to the graphics processor via a bus.

23 Claims, 4 Drawing Sheets

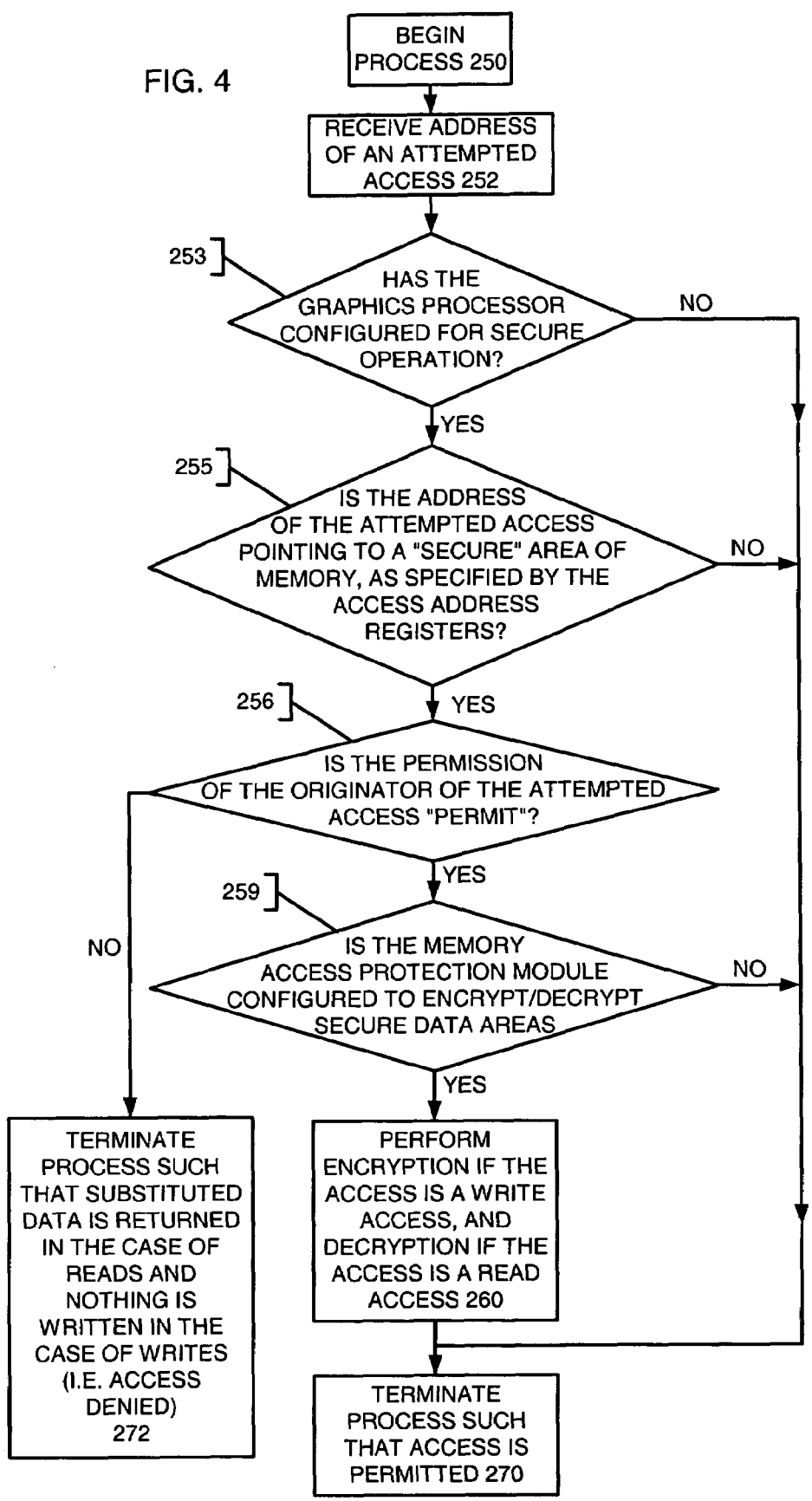

METHOD AND APPARATUS FOR MAINTAINING SECURE AND NONSECURE DATA IN A SHARED MEMORY SYSTEM

FIELD OF THE INVENTION

The invention relates generally to providing data security in a shared memory system and more particularly to maintaining secure and non-secure data in a shared memory system.

BACKGROUND OF THE INVENTION

Many systems contain a data storage device that can be accessed by several processing devices. For example, a graphics processor and a host processor within a computer system may access a shared portion of a memory. Another example is a digital television system, in which a graphics processor (e.g., a graphics chip) shares many system resources with a central processing unit on a processor chip. Typically, various processes executing on the various processors throughout a system can read and write to memory throughout the system. For example, the central processing unit may execute a spreadsheet or other software application that writes graphics images to a monitor, while a 3D graphics rendering engine whites 3D (three-dimensional) graphics images to the same monitor. Accordingly, both processors access information in a frame buffer such as VRAM (video random access memory), SDRAM or any other suitable memory used by the graphics processor.

A digital television system may be designed to receive a packetized video stream that is both encrypted (e.g., using a copy protection key or other encryption key) and compressed (e.g., using an MPEG encoder). The digital television system may include a decryption module that decrypts the received video stream to generate a compressed decrypted representation of the video stream. The compressed decrypted representation may be used directly, for example to update the VRAM, or it may be uncompressed to provide full images to the VRAM. Typically, the graphics processor stores the compressed decrypted representation within the VRAM. The compressed decrypted representation of the video stream is then uncompressed to generate an uncompressed decrypted representation of the video stream that is used by the graphics processor to provide images to the monitor.

Unfortunately, a compressed decrypted representation of the video stream can be a very attractive target for illicit copying, since it can easily be copied onto another media such as networked storage or a removable medium such as a hard disk, CD-ROM, or DVD and transferred to another digital television system for viewing. The encrypted video stream is a less attractive target for illicit copying since it is only useable by persons having access to a corresponding decryption key. The decrypted uncompressed video stream is likewise a less attractive target for illicit copying since it is so large and may require an inconveniently large amount of storage space.

When the graphics processor performs no function other than the decryption and decompression of encrypted, compressed video streams, the problem may be addressed simply by concealing the VRAM within the graphics processor. However, when the graphics processor resides within a digital television system, other processors typically have access to the VRAM. For example, processes executing on a central host processing unit may read data from the VRAM over a user accessible bus such as a PCI (peripheral component interconnect) bus to which both the graphics processor and the central processing unit are coupled.

Consequently, a need has arisen for a method and apparatus for securing data in shared memory systems.

BRIEF DESCRIPTION OF THE DRAWINGS

FIG. 4 shows a flowchart of a process of accessing data on a graphics processor, in accordance with one embodiment of the present invention.

DETAILED DESCRIPTION OF A PREFERRED EMBODIMENT OF THE INVENTION

Figure 1:
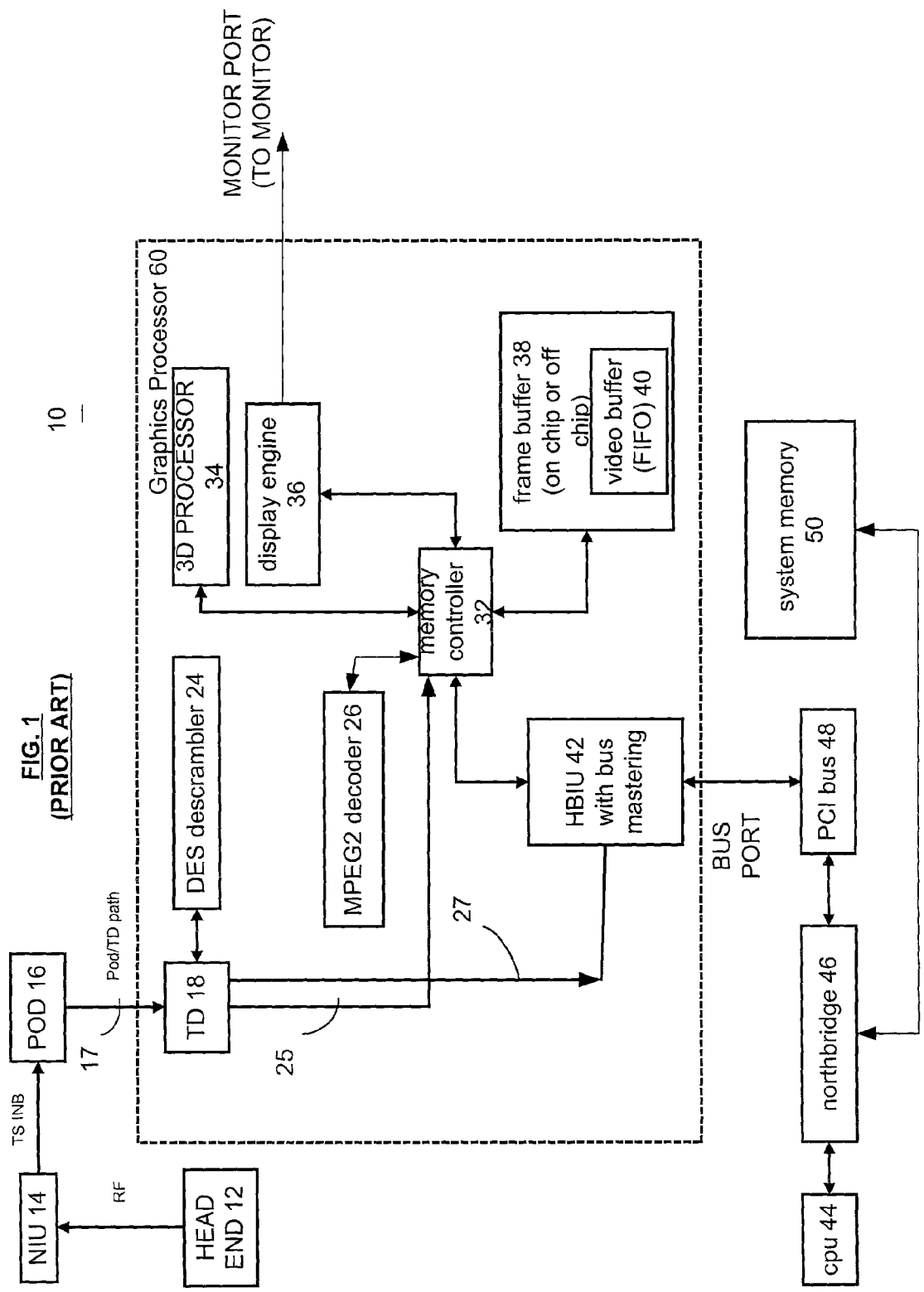
FIG. 1 shows a block diagram of a portion of a digital television system, in accordance with a well-known design.

FIG. 1 shows a block diagram of a portion of a digital television system 10, in accordance with a well-known design. The digital television system 10 is used to play video and multimedia content that is received from an originator of the video and multimedia content via a transmission medium. The video and multimedia content may be compressed and encrypted, and may be transmitted to the digital television system via coaxial cables (i.e., cable television), radio-frequency transmissions, satellite transmissions, streaming video transmission over the Internet, or from a CD-ROM, DVD, or hard drive.

The digital television system 10 of FIG. 1 is, for example, coupled to receive video and multimedia content via a cable network. The digital television system 10 has a conditional access data provider such as a POD module 16 or other suitable source that is coupled to a head end 12 via an NIU 14 (network interface unit) that receives a radio-frequency transmission from the head end 12 via the cable network. The radio-frequency transmission includes several compressed, encrypted video streams, as well as some "overhead" information that is used by the digital television system to interpret the radio-frequency transmissions.

The NIU 14 provides a TS (transport stream) to the POD (point of deployment) module 16. The TS is encrypted with a "conditional access" encryption protocol, which may be referred to as a "scrambling" protocol. In the example shown in FIG. 1, the conditional access encryption protocol is proprietary, although publicly available conditional access encryption protocols may be used.

The POD module 16 performs an inverse conditional access algorithm to decrypt or "descramble" the transport stream to generate an unencrypted, compressed representation of the video streams.

The POD module 16 then encrypts the unencrypted, transport stream containing compressed representation of the video streams using an encryption scheme such as a DES data encryption standard ECB electronic code book. In other words, the POD module 16 performs data encryption using an ECB mode of DES. Because the transport stream is encrypted, accessing the video streams at this point does not allow an illicit copier to obtain a marketable version of the video streams.

The POD module 16 provides the conditional access information such as DES-encrypted transport streams 17 to a TD (transport demultiplexer) 18 within a graphics processor 60. The DES-encrypted transport stream 17 is reduced to a video PES (packetized elementary stream). The consumer's set top box or digital television system receives the DES-encrypted transport stream.

As known in the art, the TD 18 allows the graphics processor 60 to select an unencrypted compressed video stream from among those encoded in the DES-encrypted transport stream after the transport steam has been decrypted.

As shown, the TD outputs non-video information 27 that may be stored in the system memory. The unencrypted compressed video stream 25 is extremely valuable to illicit copiers, who can find a market in such video content. By simply copying the unencrypted compressed video stream from the TD 18 to the TD 18 onto a removable medium such as a CD-ROM, an illicit copier can produce a CD-ROM that can be sold.

The TD differentiates between the type of data. If the data is a compressed video stream, it is not sent to the CPU. For example, the central processing unit 44 receives close captioning, electronic program guide information, and other information contained within the transport stream.

The TD 18 provides the unencrypted compressed video stream to the memory controller 32. The memory controller 32 stores the unencrypted compressed video stream 25 in video buffer 40 within the frame buffer 38. The memory controller 32 receives requests for a block of unencrypted compressed video stream data when the MPEG2 decoder 26 is ready to process. The TD 18 requests from the memory controller 32 a block of unencrypted compressed video stream stored in the video buffer 40. The MPEG-2 decoder 26 allows full-frame MPEG-2 images to be generated from the unencrypted compressed video stream. Specifically, the MPEG2 decoder 26 removes all of the headers from the packets, expands the unencrypted compressed video stream to unencrypted uncompressed video picture and sends the unencrypted uncompressed video picture to the memory controller 32. The memory controller 32 stores the unencrypted uncompressed video pictures in the picture buffer 41 (i.e., display buffer) within the frame buffer 38.

The memory controller 32 receives requests for a line from the uncompressed video picture stored in the picture buffer 41 when the display engine 36 is ready to process the next presentation picture. The display engine 36 processes the unencrypted uncompressed video pictures for presentation to the monitor port, as known in the art.

As known in the art, the HBIU (Host Bus Interface Unit) 42 interfaces with the host CPU 44 and is used to allow, among other things, the host CPU 44 to access the frame buffer. Also, as is known, the 3D-processor 24 can move data within the frame buffer 38 by copying blocks of memory containing data into other blocks of memory that can receive data called a bit blit. For example, a user may execute a graphics program on the central processing unit 44, and may indicate that the user wishes to drag a figure or stretch a figure. Accordingly, the 3D-processor 24 moves the data pertaining to the figure from a first block of memory associated with the figure's original position and size to a second block of memory associated with the figure's new position and size.

In addition to providing the unencrypted uncompressed video stream via the HBIU 42 to the memory controller 32, the HBIU 42 also permits the graphics processor 60 to operate with other devices over a user accessible bus 48 such as a PCI bus. The bus 48 may be a 33-MHz bus that couples the HBIU 42 of the graphics processor 60 to a northbridge 46 or other PCI-compatible bus bridge, or any other suitable bus. The northbridge 46 couples the central processing unit 44 to the PCI bus 48 and to system memory 50. Other devices within the digital television system, such as the central processing unit 44, may access resources within the graphics processor 60, and devices within the graphics processor 60 may access other resources within the digital television system, via the HBIU 42. Similarly, the graphics processor may access system resources such as a system memory 50 via the PCI bus 48 and the northbridge 46.

System memory 50, such as SDRAM, is also available to the central processing unit 44 via the northbridge 46. The graphics processor 60 therefore has three locations at which an unscrupulous person seeking to produce an illicit copy might strike. One such location is the input port, at which the graphics processor 60 receives data from the POD module 16. However, as stated previously, the POD provides data that is encrypted using a DES algorithm in ECB mode. Because the transport streams are encrypted, intercepting the transport streams at this point does not allow an illicit copier to obtain a marketable version of the video streams. Another location is the bus port, at which the graphics processor 60 (via the HBIU 42) exchanges data and control information with the PCI bus 48. A third location is the monitor port, at which the 3D-processor 24 and the display engine 36 provide data to the monitor. Another location is the interface to the external RAM.

At the second location, an unscrupulous person seeking to produce an illicit copy may seek to copy the data in real-time, as it is provided from the HBIU 42 to the frame buffer 38 via, among other elements, the HBIU 42. Because the HBIU 42 is coupled to the PCI bus 48, it may be possible to intercept and copy the data passing through the HBIU 42 and copy the data onto another device coupled to the PCI bus 48. Although the graphics processor 60 is coupled to the PCI bus 48, copying the unencrypted uncompressed video stream via the HBIU 42 and the PCI bus 48 is extremely difficult. Therefore is may not be necessary to encrypt this information.

For similar reasons, the unencrypted uncompressed video stream is not easily attainable at the third location (i.e., the monitor port), at least not in real time. The data from the graphics processor 60 to the monitor also has an extremely high data rate. Moreover this information is typically protected through other mechanisms such as timing alterations (Macrovision) or HDCP based approach.

Since copying the data in real time is prohibitive, the unscrupulous person attempting to produce an illicit copy of the data may attempt to copy the data directly from the frame buffer 38. This is possible since the frame buffer 38 is accessible to processes executing on the central processing unit 44. Moreover, the frame buffer 38 itself is amenable to having data moved from one location to another, as described above with respect to operations performed by the 3D-processor 24. Therefore, a software application could be used to obtain the data.

Figure 2:
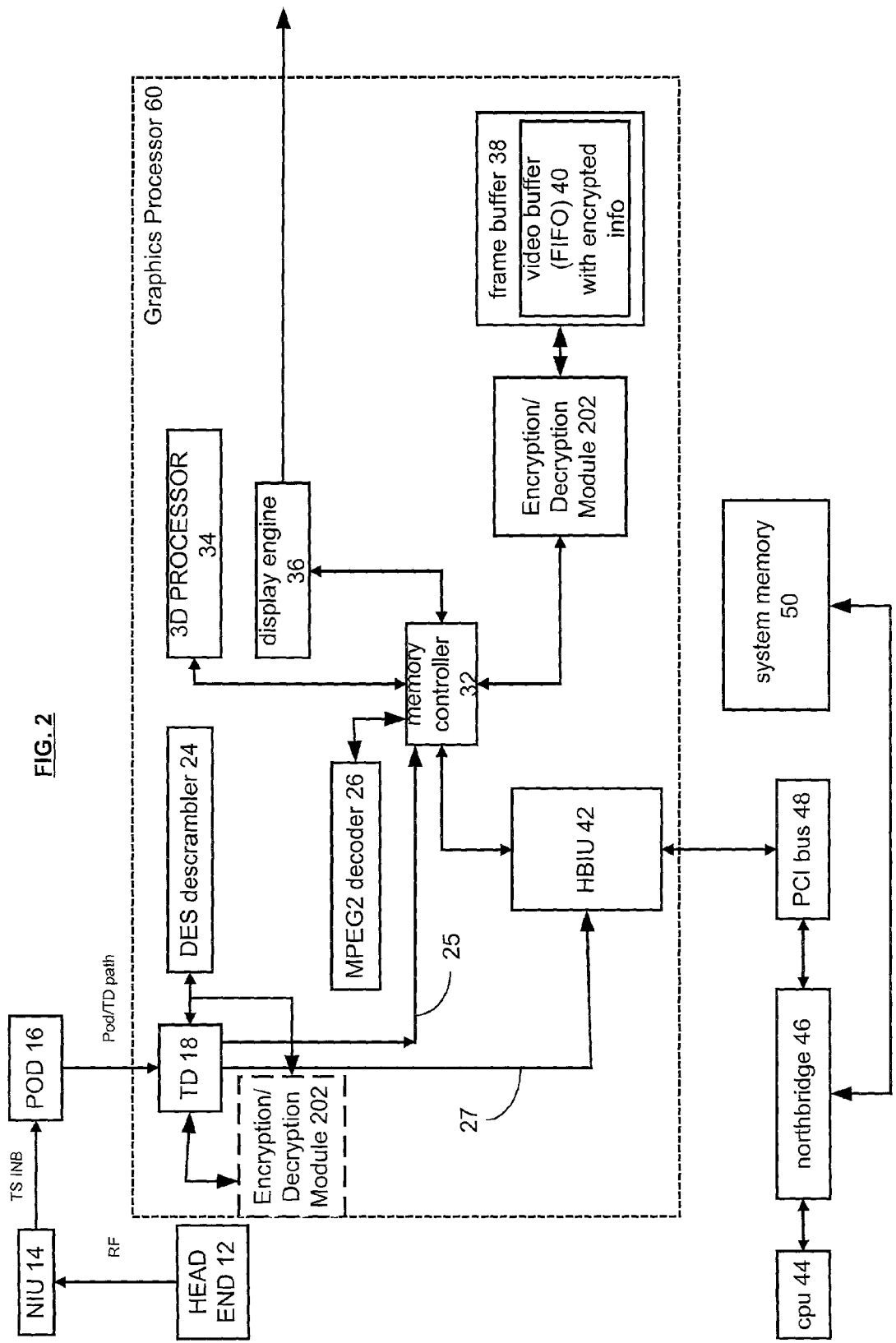
FIG. 2 shows a block diagram of a portion of a digital television system, in accordance with one embodiment of the present invention.

FIG. 2 shows a block diagram of a portion of a system in accordance with one embodiment of the present invention. It will be recognized that although shown as interfacing with a POD based system, the disclosed method and apparatus can be used with any encrypted data in any suitable system or arrangement. An encryption/decryption module 202 is located between the memory controller 32 and in this example, the local (e.g., off chip or on-chip) frame buffer memory 38. A frame buffer stores information, including but not limited to compressed video, uncompressed video frames, graphics elements from a rendering engine, and frames for display. The encryption/decryption module 202 selectively encrypts at least some of the data passing through the encryption/decryption module 202 en route to the local frame buffer memory 38 to provide encrypted data, and then stores the encrypted data in the local frame buffer memory 38. Little or no unencrypted data corresponding to the data to be protected is stored in the frame buffer 38. The encryption module 102 also decrypts the encrypted data from the frame buffer 38 and provides decrypted data from the frame buffer 38 to the memory control 32.

The encryption/decryption module 202 operates, in one embodiment, using a DES encryption/decryption scheme. If desired, the encryption module 202 may operate using a public key/private key cryptographic operation, conditional access algorithm, or any other suitable cryptographic technique.

In accordance with one embodiment of the present invention, when any memory access client (e.g., the TD 18 or the CPU 44) attempts to pass (write) data to the local frame buffer 38, the encryption/decryption module 202 examines the address to which the data is being written. If the address indicates that the data is to be protected (i.e., falls within a defined address range), then the encryption module 102 encrypts the data to produce encrypted data, and then writes the encrypted data to the frame buffer 38. If desired, the encryption module 202 may also encrypt other data as well as producing additional encrypted data (not part of the transport stream) and write the additional encrypted data to the frame buffer 38 on an as-needed basis.

Alternatively, the encrypt/decryption module 202 may be incorporated as part of the TD 18 and encryption may be performed on a per stream basis based on configuration bits in the stream. For example, if a stream contains copy protected data, this stream is encrypted. Also, if desired, memory access may be granted or denied based upon the PID number (i.e., the packet identification number) that describes each packet. The PID of a received packet may be used in lieu of the address of the attempted access to grant or deny access.

Accordingly, even if an illicit copier managed to copy or move the data residing within the encrypted memory space to another (external) device such as a writable CD-ROM, ZIP® brand storage device, hard drive, or other storage device, the data would be of little or no use to the illicit copier. Only by decrypting the data using the appropriate keys could the illicit copier gain access to the content.

Figure 3:
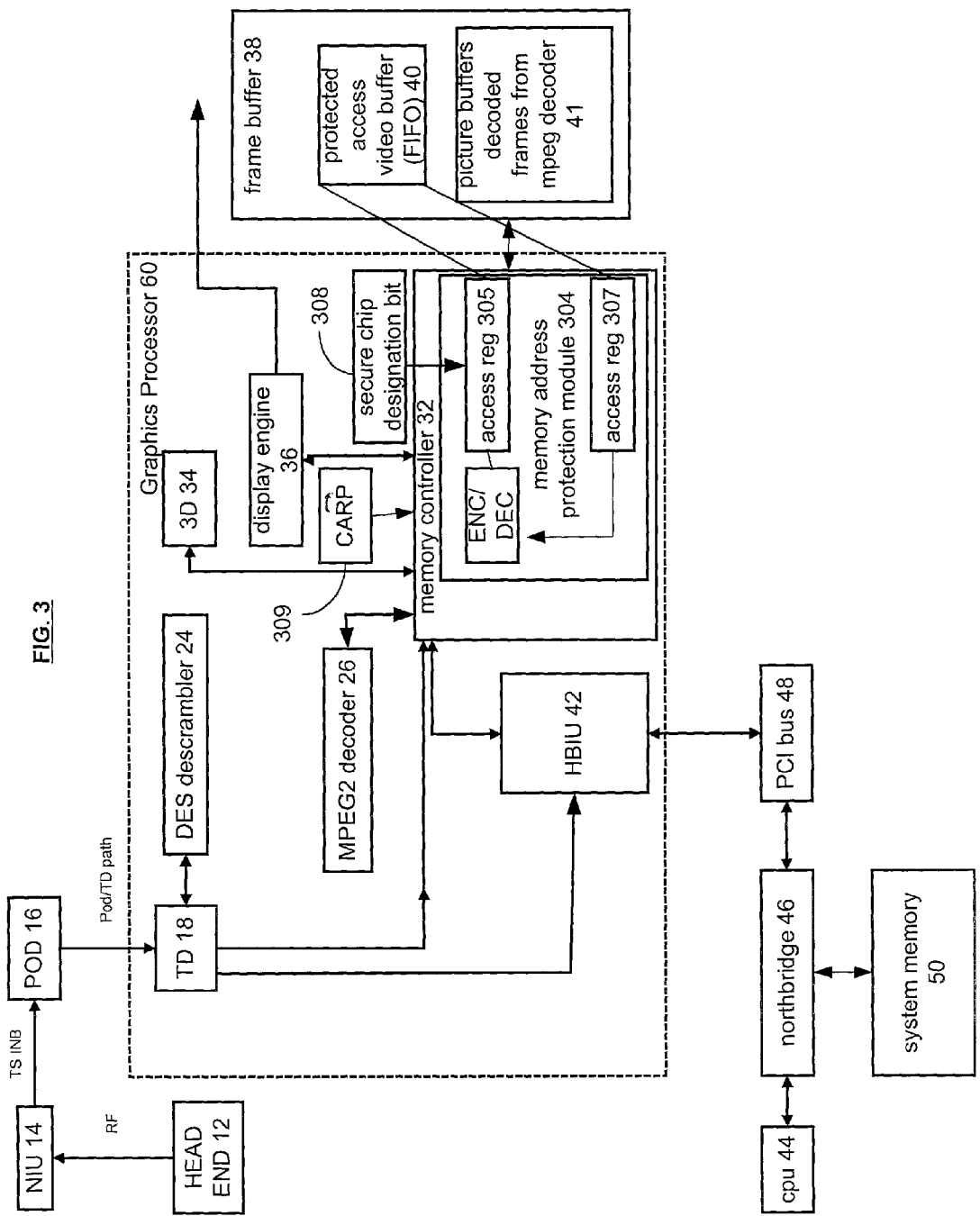
FIG. 3 shows a block diagram of a portion of a digital television system employing an addressed based security technique in accordance with one embodiment of the present invention.

FIG. 3 shows a block diagram of a portion of a system, in accordance with yet another embodiment of the present invention. As shown in FIG. 3, the memory controller 32 includes a memory address protection module 304. The memory address protection module 304 contains or has access to at least one start access address register 305 and an end access address register 307 that identify a secure region within a non-local (or local) frame buffer 38. The start access address register 305 contains an address (or index thereto) that identifies a start boundary of the secure region of the video memory. Similarly, the end access address register 307 includes the end address of a contiguous register space within the non-local frame buffer 38 that is used as a FIFO, such as a video buffer 40.

The encryption/decryption module is shown as part of the memory access protection module may included as part of any suitable block. However, encryption need not be used and the secure region need not contain encrypted data since only specified clients are allowed to access the secure region. However, as described below, both address access limitation techniques and encryption techniques will be described. In accordance with one embodiment of the present invention, the graphics processor 60 contains both the encryption module 202 (FIG. 2) and the memory address protection module 304. Encryption of the frame buffer contents may be encrypted based on for example whether an address in within a secure region, whether the address is marked by an accessing client, on a per stream basis or any other suitable criteria.

If desired, the encrypted portion of the memory space may be in a contiguous region within the address space of the frame buffer 38. In other words, all addresses between a first threshold address and a second threshold address are directed to the encrypted memory space, and data written to the encrypted memory space is encrypted. Similarly, if desired, the encrypted portion of the memory space may be in a discontiguous region within the address space of the frame buffer 38. In other words, the encrypted portion may be defined between pairs of threshold addresses, and all addresses between a first threshold address of each pair of threshold addresses and a second threshold address of each pair of threshold addresses are directed to the encrypted memory space, and data written to the encrypted memory space is encrypted.

In the example of FIG. 3, two access address registers 305 and 307 are provided, i.e. a first address register and a second address register. Each of the two access address registers 305 and 307 may contain an address within the video memory 40. When each of the access address registers 305 and 307 contains an address, the two address registers 305 and 307 define a bounded region within the video memory that cannot be accessed by the central processing unit 44. The memory address protection module 304 prevents the central processing unit, and any other bus masters on the PCI bus 48 or attempts to access the video memory via the HBIU 42, from reading data stored in the secure region.

If desired, a plurality of comparators and comparison logic may be used as part of the memory address protection module 304. Each of the comparators is coupled to a distinct access address register containing a pointer, and is operative to compare the pointer to an address of an attempted access. The comparison logic is operative to determine, based on output from the comparators, whether the address of an attempted access is within a protected region of the video memory.

Alternatively, if desired, only one access address register (305 or 307) is provided. The access address register may contain an address within the video memory or any portion of frame buffer. When the access address register contains an address, the address register containing memory location define a bounded region within the video memory that cannot be accessed by the central processing unit. For example, all memory locations beyond (or above) the threshold address in the access address register fall within the bounded region within the video memory that cannot be accessed by the central processing unit. The memory address protection module 304 prevents the central processing unit, and any other bus masters on the PCI bus 48 or attempts to access the video memory via the HBIU 42, from reading data stored in the secure region. In operation, the memory controller 32 passes substituted data ("bad" data) back to the CPU to complete the access cycle. For example, if a memory request by the CPU for data is in the secure region, the memory controller reads data from a nonsecure portion instead of the secure portion.

In another embodiment, multiple bounded regions may be provided. Specifically, multiple pairs of access address registers are provided. Each of the access address registers of any pair may contain an address within the video memory. When each of the address registers of any pair contains an address, the two access address registers 305 and 307 define a bounded region within the video memory that cannot be accessed by the central processing unit. The memory address protection module 304 prevents the central processing unit, and any other bus masters on the PCI bus 48 or attempting to access the video memory via the HBIU 42, from reading data stored in the secure region.

The graphics processor 60 is configurable as a secure chip or as an unsecure chip. Such configuration cannot easily be altered once the chip has been manufactured. When configured as a secure chip, the access address registers 305 and 307 are wire-bonded to be writable only when empty. The configuration as whether a secure chip or an unsecure chip is determined by a single secure chip designation bit 308 (or multiple bits if desired) residing within the graphics processor 60 itself The single bit 308 may be set or cleared by either the manufacturer of the chip or an OEM (original equipment manufacturer) manufacturing a system containing the chip. In accordance with one embodiment of the present invention, the single bit 308 is a fusable (or antifusable) connection to either power or ground. If desired, the single bit 308 may be read from a ROM residing on the graphics processor 60.

The single bit 308 is such that tampering with the single bit 308 cannot reduce the security of the graphics processor 60. For example, the graphics processor 60 may be manufactured as an unsecure chip and may be converted to a secure chip by fusing or antifusing a connection to either power or to ground. Similarly, the graphics processor 60 may be manufactured such that the single bit is inaccessible to external tampering. Accordingly, tampering cannot convert the graphics processor 60 from a secure chip to an unsecure chip.

A non-reversible mechanism is used to convert the graphics processor 60 to a secure chip before shipping. However for debugging purposes, the chip is configured in an unsecure mode. To configure the graphics processor 60 as an unsecure chip, the single bit is set to an "1" or "0" via simple circuit such as a resistor and fuse configuration. A pin (bit) may be connected to power via a resistor, and to ground via a fuse. The graphics processor 60 may then be converted to a secure chip by fusing the fuse. If desired, single bit may be connected to power via an antifuse, and to ground via a resistor. The graphics processor 60 may then be converted to a secure chip by antifusing the antifuse. Because fusing and antifusing are difficult for the typical end user to perform, the graphics processor 60 is not easily converted by the end use from a secure chip to an unsecure chip, since the single bit is a fusable (or antifusable) connection to either power or ground.

In addition, the graphics processor 60 also includes a reversible process for turning on and off the encryption/access register modes. Such a graphics processor 60 contains suitable logic (not shown) such as an AND gate, the output of which disables the encryption module 202 or the memory address protection module 304 via an enable signal, i.e. the components that permit or deny access to an unencrypted version of the data that is to be protected to configure the chip as an unsecure chip. The input being accessible via a pin or internal register to toggle between the secure and non-secure mode so that testing of the chip in both modes can be accomplished.

If desired, the single bit may reside in software implemented within a ROM residing on the graphics processor 60. Firmware (basic input output system) or other operation determines whether the chip is a secure chip or an unsecure chip. In accordance with one embodiment of the present invention, the single bit may be set or cleared by either the manufacturer of the chip or an OEM manufacturing a system containing the chip. If desired, the single bit may be read from a ROM residing on the graphics processor 60. The ROM may be flash memory that may be written at any time by the manufacturer of the chip or by an OEM, but is not easily re-written by an end user.

During initial configuration (usually after power-up or system reset), the CPU 44 determines whether the graphics processor 60 is configured to be secure. This may be done by reading a configuration register containing the secure chip designation bit. If the graphics processor 60 is secure, the CPU 44 proceeds to write the access address registers to define the "secure" area(s) in the video memory. This is done while the CPU 44 is executing initialization code that may be part of the BIOS, or operating system initialization code. This initialization code is considered safe, since it is provided by the manufacturer or OEM and is stored in system ROM or graphics processor ROM, and the manufacturer or OEM has taken steps to insure that this code is not easily modified by users.

The access address registers 305, 307 in the memory access protection module 304 can be written only once. All subsequent writes to these registers will be ignored. The only way to enable writing to these registers again is to initiate a hardware reset of the graphics processor 60. Therefore, once the secure area(s) has been set up by the initialization code, a rogue SW program will not be able to gain access to the secure area of video memory by rewriting the access address registers.

FIG. 4 shows a flowchart of a process of accessing data on a graphics processor, assuming the chip is configured as a secure chip. The process begins at step 250 and proceeds to step 252. At step 252, an address of an attempted access is received, for example, by the memory controller 32 containing the address protection module 304 from a memory reading client. At step 253, the process includes determining, such as by the memory access protection module, whether the graphics processor is configured for secure operation as indicated for example by the secure chip designation bit. If the graphics processor 60 is not configured as a secure chip, the process is terminated as shown in block 270 and access is permitted. However, of the graphics processor 60 is configured as a secure chip, the process continues to block 255 where the address of the attempted access is compared with the contents of the access registers to determine whether the attempted access is to a protected address or address range. If so, the process continues to block 256. Otherwise the process continues to block 270.

At step 256, the memory reading client that is attempting access is identified to determine whether it is an authorized reading client or an unauthorized reading client. This is done by reading the client access privilege register (CAPR) when a new request is made on a memory access port to determine whether the reading client is designated as an approved frame buffer reading client. The reading client may be, for example, the bus master, a graphics processor, central processing unit or other circuit that has attempted to access the video memory by providing the address.

Step 256 need not determine the reading client with any specificity, but does determine a permission associated with the client. The permission is either "permit" or "deny" based on the content of the client access privilege register 309. For example if the register 309 is fused or programmed to indicate that the video decoder 26 reading client has access to the range of secure addresses, the memory controller allows access to the address range if a request is received via its decoder port. Similarly, the register 309 may have a deny indication for the HBIU 42, the 3D processor 34 and the display engine 36. It will be recognized that if the client access privilege register (CAPR) is used, the secure chip designation bit is not necessary.

Alternatively, if desired, access may be granted or denied based upon the PID number (i.e., the packet identification number) that describes each packet. The PID of a received packet may be used in lieu of the address of the attempted access to grant or deny access.

If the memory address protection module determines that the permission is not "permit," then the process proceeds to step 272 and terminates such that substituted data (e.g., data other than from the secure region) is sent back to the reading client and nothing is written (e.g., access is denied) if the request is a write request. If it is determined that the permission is "permit," then the process proceeds to step 259.

At step 259, if the memory access protection module is configured to encrypt/decrypt data, the process continues to step 260 where encryption is performed by the encryption/decryption module 202 if the access is a write access, and decryption is performed if the access is a read access. The process then proceeds to step 270 and terminates such that access is permitted.

In accordance with another embodiment of the present invention, at step 272 the process indicates to the originator of the attempted access that the attempted access is denied. In other words, the originator receives an error message indicating that the attempted access has failed.

If desired, instead of (or in addition to) providing an error message at step 272, the process provides a null value or a predetermined value. The predetermined value is, for example, zero. The predetermined value may be obtained from a register, or may be "hard-wired." Alternatively, if desired, instead of (or in addition to) providing an error message, the process redirects the attempted access to a predetermined memory location. The predetermined memory location is, for example, an unsecure location in the video memory.

As described above, hardware and/or software may be used to prevent bus masters coupled to the graphics processor via a user from accessing portions of the video memory while permitting access to other portions. The location of the HBIU 42(i.e., whether the HBIU with bus master is located on-chip or off-chip), the configuration of the graphics processor itself, the address of the attempted access, and the type of data being accessed can be relevant in determining whether access is permitted or denied. Accordingly, bus masters coupled to the graphics processor via the PCI bus 48 are denied access to the unencrypted compressed video, even though the unencrypted compressed video is stored on the graphics processor, and even though the bus masters coupled to the graphics processor via the PCI bus 48 can access other portions of the video memory. An encryption module may be desirable where the video memory is not on-chip with a graphics engine or DES descrambler. An address-based access control scheme (with or without encryption) may be desirable when the frame buffer is local.

Where only encryption/decryption is used instead of access registers, the memory controller encrypts or decrypts data if the accessing client in indicated as an approved client. Where only the access registers are used, the address being accessed determines whether access is allowed.

It should be understood that the implementation of other variations and modifications of the invention in its various aspects will be apparent to those of ordinary skill in the art, and that the invention is not limited by the specific embodiments described. For example, the graphics processor may be a collection of graphics chips residing on multiple graphics cards, sharing a common configuration (i.e., either secure or unsecure) and sharing comparator logic. The graphics chip may be a graphics processor within a larger system on a chip configuration. It is therefore contemplated to cover by the present invention, any and all modifications, variations, or equivalents that fall within the spirit and scope of the basic underlying principles disclosed and claimed herein.

What is claimed is:

1. A device comprising:
   a graphics rendering engine; and
   a frame buffer memory, operatively coupled to the graphics rendering engine, that is accessible to a user bus, wherein the frame buffer memory has a defined secure area and an unsecure area;
   a plurality of writing clients including a set of authorized writing clients having an ability to write to the secure area and the unsecure area; and
   a set of unauthorized writing clients having an ability to write to the unsecure area and lacking an ability to write to the secure area.

2. The device of claim 1, wherein access to the secure area is controlled by at least one access register defining at least one bound of the secure area.

3. The device of claim 2, wherein the at least one access register may only be written if the at least one access register is uninitialized.

4. The device of claim 2, wherein the at least one access register is a one-time programmable register.

5. The device of claim 1, further comprising at least one frame buffer reading client having an ability to read the secure area and at least one unauthorized reading client having an ability to read the unsecure area and lacking an ability to read the secure area.

6. The device of claim 5, further comprising a memory controller that receives a memory access request from a client of the plurality of reading clients and determines an access privilege of the client based on content of a client access privilege register, and selects one of at least refusing access and permitting access.

7. The device of claim 5, further comprising if the memory controller selects refusing access, the memory controller further selects at least one of denying access, providing of erroneous data, and providing scrambled data.

8. The device of claim 1, further comprising:
   a memory controller that receives an access request from a client of the plurality of clients and
   determines an access privilege of the client, and selects at least one of refusing access and permitting access.

9. The device of claim 1, wherein:
   each client of the set of authorized writing clients has an access privilege allowing the client to write to the secure area and the unsecure area, and
   each client of the set of unauthorized writing clients has an access privilege allowing the client to write to the unsecure area and prohibiting the client to write to the unsecure area.

10. The device of claim 9, wherein the access privileges are determined by a hardware enabling device.

11. The device of claim 9, wherein the access privileges are hardwired.

12. The device of claim 9, wherein the access privileges are fusible.

13. The device of claim 1 including a memory controller operatively coupled to the frame buffer memory and operative to pass substituted data back to a requesting client where a memory request by the client is for data in a secure region.

14. The device of claim 1 wherein the ability to write to the secure area and the unsecure area by a writing client and wherein the ability to write to the unsecure area and lacking an ability to write to the secure area by an unauthorized writing client is determined in response to a memory request made by either the writing client or unauthorized writing client.

15. An integrated circuit for an electronic system, the integrated circuit comprising:
 a graphics rendering engine;
 a local frame buffer memory coupled to the graphics rendering engine and having a secure area and an unsecure area, the secure area and the unsecure area being accessible by the graphics rendering engine;
 a user bus interface coupled to the graphics rendering engine and to the local frame buffer memory, the user bus interface operative to couple the integrated circuit to a user bus and to provide access of the unsecure area to the user bus;
 a plurality of reading clients including a set of authorized reading clients having an ability to read the secure area and the unsecure area, and a set of unauthorized reading clients having an ability to read the unsecure area and lacking an ability to read the secure area;
 a memory access protection module that receives an access request from a client of the plurality of clients and determines an access privilege of the client, and selects one of a set consisting of refusing access and permitting access;
 if the memory access protection module selects refusing access, the memory access protection module further selects one of a set consisting of denying access, providing of erroneous data, and providing scrambled data;
 wherein the memory access protection module receives an access request from a client of the plurality of clients and determines an access privilege of the client, and selects at least one of refusing access and permitting access; and
 wherein each client of the set of authorized writing clients has an access privilege allowing the client to write to the secure area and the unsecure area, and each client of the set of unauthorized writing clients has an access privilege allowing the client to write to the unsecure area and prohibiting the client to write to the unsecure area.

16. The integrated circuit of claim 15, wherein access to the secure area is controlled by at least one access register defining at least one bound of the secure area.

17. The integrated circuit of claim 16, wherein the at least one access register may only be written if the at least one access register is uninitialized.

18. The integrated circuit of claim 16, wherein the at least one access register is a one-time programmable.

19. The integrated circuit of claim 18, wherein the at least one access register is a one-time programmable nonvolatile register.

20. The integrated circuit of claim 15, wherein the access privileges are determined by a hardware enabling device.

21. The integrated circuit of claim 20, wherein the access privileges are hardwired.

22. The integrated circuit of claim 20, wherein the access privileges are fusible.

23. A graphics processing apparatus comprising:
 a frame buffer memory that is accessible to a user bus;
 an encryption/decryption module operatively coupled to the frame buffer memory, the encryption module operative to encrypt data passed to the frame buffer memory and decrypting data passing from the frame buffer memory; and
 wherein the data has an address within the frame buffer memory, wherein the encryption/decryption module selectively scrambles data passed to the frame buffer memory and unscrambles data passing from the frame buffer memory according to whether the address is within a secure range of addresses.

* * * * *